US011952937B2

(12) United States Patent
Grether et al.

(10) Patent No.: US 11,952,937 B2
(45) Date of Patent: Apr. 9, 2024

(54) TWO-STROKE ENGINE

(71) Applicant: Andreas Stihl AG & Co. KG, Waiblingen (DE)

(72) Inventors: Michael Grether, Waiblingen (DE); Robert Koehli, Winnenden (DE); Richard Wirt, Waiblingen (DE); Bernd Engel, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 18/334,193

(22) Filed: Jun. 13, 2023

(65) Prior Publication Data

US 2023/0399973 A1 Dec. 14, 2023

(30) Foreign Application Priority Data

Jun. 13, 2022 (EP) .................................... 22178631

(51) Int. Cl.

*F02B 25/00* (2006.01)
*F02B 33/02* (2006.01)
*F02B 75/02* (2006.01)

(52) U.S. Cl.

CPC .............. *F02B 33/02* (2013.01); *F02B 75/02* (2013.01); *F02B 2075/025* (2013.01)

(58) Field of Classification Search

CPC .. F02B 25/14; F02B 33/04; F02F 1/22; F02M 35/1019

(Continued)

(56) References Cited

U.S. PATENT DOCUMENTS 4,469,054 A 9/1984 Onishi et al.
4,955,333 A 9/1990 Klomp (Continued)

FOREIGN PATENT DOCUMENTS

CH 313444 A 4/1956
DE 31 08 519 A1 9/1982

(Continued)

OTHER PUBLICATIONS

Xutao et al., "Simulation of a two-stroke dimethyl-ether free piston engine operating on HCCI combustion", 2011 International Conference On Transportation, Mechanical, and Electrical Engineering (TMEE), Changchun, China, IEEE, Dec. 16, 2011, pp. 2106 to 2110, XP032181240.

*Primary Examiner* — Long T Tran
*Assistant Examiner* — James J Kim
(74) *Attorney, Agent, or Firm* — Walter Ottesen, P.A.

(57) ABSTRACT

A two-stroke engine possesses a cylinder, in the cylinder bore of which a combustion chamber is formed. The combustion chamber is bounded by a reciprocating piston, which drives a crankshaft rotatably mounted in a crankcase. A crankcase interior is fluidically connected to the combustion chamber across at least one transfer channel in at least one position of the piston. The at least one transfer channel emerges with a discharge opening in the crankcase interior and with at least one transfer window on the cylinder bore. It is proposed that all transfer channels have an average length as measured from the discharge opening to the transfer window, the average length being at least 1.5 in relation to the stroke, and that the volume of the crankcase interior including all transfer channels is at most 3.1 in relation to the piston displacement.

22 Claims, 3 Drawing Sheets

(58) Field of Classification Search
USPC .......................................................... 123/65 E
See application file for complete search history.

(56) References Cited

U.S. PATENT DOCUMENTS

| | | | | |
|---|---|---|---|---|
| 6,293,234 | B1 * | 9/2001 | David ........................ | F02F 1/22<br>123/73 R |
| 10,100,718 | B2 * | 10/2018 | Thoelking ............... | F02B 33/04 |
| 2009/0056687 | A1 * | 3/2009 | Pien ........................ | F02M 69/10<br>123/73 R |
| 2011/0146642 | A1 | 6/2011 | Geyer et al. | |
| 2017/0175615 | A1 | 6/2017 | Yamazaki et al. | |
| 2021/0254544 | A1 * | 8/2021 | Koehli ................... | F02M 61/14 |

FOREIGN PATENT DOCUMENTS

| | | | |
|---|---|---|---|
| DE | 10 2009 059 143 | A1 | 6/2011 |
| EP | 3 184 775 | A1 | 6/2017 |
| JP | S61-268820 | A | 11/1986 |

* cited by examiner

TWO-STROKE ENGINE

CROSS-REFERENCE TO RELATED APPLICATIONS

This application claims priority of European patent application no. 22178631.2, filed Jun. 13, 2022, the entire content of which is incorporated herein by reference.

BACKGROUND

In the prior art, configurations of two-stroke engines with comparatively long transfer channels are known, for example from US2011/0146642. It has been found that low exhaust values can be achieved with long transfer channels. However, it has also been found that a drop in performance is noticed in two-stroke engines with comparatively long transfer channels at high speeds of revolution.

SUMMARY

It is an object of the disclosure to provide a two-stroke engine which makes possible low exhaust values with a favorable performance.

This object is, for example solved by a two-stroke engine having: a cylinder having a cylinder bore; a combustion chamber formed in the cylinder bore; a crankcase defining a crankcase interior; a crankshaft rotatably mounted in the crankcase; a reciprocating piston configured to drive the crankshaft; the combustion chamber being bounded by the reciprocating piston; at least one transfer channel; the crankcase interior being fluidically connected to the combustion chamber across the at least one transfer channel in at least one position of the reciprocating piston; the at least one transfer channel emerging with a discharge opening in the crankcase interior and emerging with at least one transfer window on the cylinder bore; an intake channel; a fuel supply unit for supplying of fuel to the intake channel or the crankcase interior; an outlet opening from the combustion chamber; wherein all of the at least one transfer channels have an average length as measured from the discharge opening to the transfer window; wherein the average length of the at least one transfer channel is at least 1.5 in relation to a stroke of the piston; and, the crankcase interior defining a crankcase volume including all of the at least one transfer channels being at most 3.1 in relation to a piston displacement.

In order to achieve favorable exhaust values, it is proposed that at least one transfer channel, in particular all transfer channels have an average length of at least 1.5 in relation to the stroke of the piston. The average length of the transfer channel is measured in each cross section of the transfer channel situated perpendicular to the flow direction through the geometric center of the channel cross section. The average length is measured from the discharge opening to the transfer window.

It has been shown that low exhaust values result, especially in transfer channels whose average length relative to the stroke is at least 1.5, but that a performance drop is noticed at high speeds of revolution in two-stroke engines thus far. It has been shown that this performance drop is due to disturbances of the combustion in the combustion chamber. During the downstroke of the piston, exhaust gases flow into the transfer channels on account of the elevated residual pressure in the combustion chamber. On account of the incoming exhaust gas, the gas volume in the transfer channel is at first accelerated in the direction of the crankcase. This movement of the gas volume must at first be reversed on account of the rising pressure in the crankcase. As a result, the transfer of air and fresh mixture to the combustion chamber is delayed. In present configurations of two-stroke engines, this has resulted in an inadequate filling of the combustion chamber with fresh mixture and thus disturbances of the combustion.

In order to balance out this delay at least in part, it is proposed that the volume of the crankcase interior is comparatively small in relation to the piston displacement. It has been shown that, for favorable performance, the volume of the crankcase interior should be at most 3.1 in relation to the piston displacement. In this way, an adequate precompression of the mixture in the crankcase and an adequately high pressure in the crankcase at the opening time of the transfer channel to the combustion chamber can be achieved, in order to accomplish a relatively early flow of fresh mixture into the combustion chamber despite the large length of the at least one transfer channel. Thus, an adequate filling of the combustion chamber with fresh mixture can be achieved, even for comparatively long transfer channels. In this way, the performance drop at high speeds of revolution can be decreased.

The average length of the at least one transfer channel, especially all transfer channels, is comparatively large, in particular.

The average length of at least one transfer channel, especially each transfer channel, is at least 50 mm in particular, especially at least 80 mm. The average length of at least one transfer channel, especially each transfer channel, is at least 90 mm in particular, especially at least 100 mm.

The ratio of the average length of the transfer channel to the piston stroke, especially for at least one transfer channel, in particular for each transfer channel, is at least 1.5, in particular at least 2. In particular, the ratio of the average length of at least one transfer channel near the inlet to the piston stroke is at least 2.5, especially at least 3. The piston stroke corresponds to the path traveled by the piston from its lower dead center to its upper dead center. Especially in particular, the discharge opening of the at least one transfer channel in the crankcase is arranged on the side of a transverse plane of the two-stroke engine where an outlet opening from the combustion chamber is also situated. The transfer window of the at least one transfer channel is situated in particular on the side of a transverse plane of the two-stroke engine where at least one inlet opening, especially a mixture inlet, is also situated.

In particular, the piston displacement of the two-stroke engine is from 50 $cm^3$ to 100 $cm^3$.

In particular, it is provided that at least one transfer channel, especially all transfer channels, has an average length of at least 2 $mm/cm^3$ relative to the piston displacement. The average length is divided by the piston displacement. For each transfer channel, the average length divided by the piston displacement should be at least 2 $mm/cm^3$. The piston displacement of the two-stroke engine corresponds to the surface of the cylinder bore multiplied by the piston stroke. The piston stroke corresponds to the path traveled by the piston from its upper dead center to its lower dead center. It has been found that low exhaust values result in particular for transfer channels whose average length relative to the piston displacement is at least 2 $mm/cm^3$.

In particular, the ratio of the volume of all transfer channels to the piston displacement is at least 1. In particular, the volume of all transfer channels is greater than the piston displacement. In particular, the ratio of the volume of all transfer channels to the piston displacement is at least 1.3, especially at least 1.5, in particular at least 1.6. The volume of all transfer channels here is the volume of all transfer channels taken together.

The flowing of exhaust gases from the combustion chamber into the at least one transfer channel occurs by virtue of the pressure difference between the combustion chamber and the crankcase interior. It has been found that the delay in the flowing of fresh mixture from the at least one transfer channel to the combustion chamber can be further decreased by lowering the residual pressure in the combustion chamber. A decrease in the residual pressure in the combustion chamber can be accomplished by the fastest possible conversion of the mixture, that is, by a fast burning. It has been found that a geometrical compression ratio of the combustion chamber of at least 10.0 is advantageous for this. The geometrical compression ratio is the volume of the combustion chamber at the lower dead center of the piston divided by the volume of the combustion chamber at the upper dead center of the piston. With a compression ratio of at least 10.0, a relatively high temperature of the mixture in the combustion chamber can be achieved at the ignition time. This favors a good and fast burning in the combustion chamber.

At the upper dead center of the piston, a flat intermediate space is formed between the piston and the combustion chamber roof for a portion of the surface of the piston, where the spacing between the piston and the combustion chamber roof as measured in the direction of the cylinder longitudinal axis is minimal. This flat intermediate space may adjoin a region where the combustion chamber roof is inclined by as much as 5° to the piston base. The surface of the combustion chamber roof which bounds the flat intermediate space and the region in which the combustion chamber roof is inclined by as much as 5° to the piston base is the squish surface of the cylinder. An especially high compression and turbulence of the mixture is produced at the squish surface of the cylinder. The mixture is moved at high speed toward the spherical cap. A good preparation of the mixture is achieved on account of the high speed and the high turbulence, as well as the high pressure obtaining because of the high compression. In order to encourage a good burning in the combustion chamber, the ratio of the squish surface to the projected surface of the cylinder bore is in particular at least 40%, in particular 40% to 50%.

A small squish gap is advantageous for high compression of the mixture. The squish gap corresponds to the spacing between the piston at the upper dead center and the combustion chamber roof at the flat intermediate space of the squish surface. In particular, the squish gap is less than 0.7 mm.

In order to be able to realize a relatively large squish surface in a simple manner and at the same time achieve a favorable mixture distribution in the combustion chamber for the burning, the spherical cap of the combustion chamber roof is arranged in particular off center. The geometric center of the spherical cap in particular has a spacing from the longitudinal center axis of the cylinder. The spacing in particular is at least 3% of the diameter of the cylinder bore. Preferably, the spacing is at least 2 mm, in particular at least 5 mm.

The spherical cap can preferably be arranged closer to the inlet side of the cylinder than to the outlet side. This is advantageous in particular when the transfer windows are oriented in the direction of the inlet side of the cylinder, so that the inflow direction from the transfer channels is pointing in the direction of the inlet and also in particular in the direction of the combustion chamber roof. The inlet side of the cylinder is the side on which an inlet opening of the intake channel into the crankcase is situated. The outlet side of the cylinder is the side of the cylinder on which the outlet opening is situated.

The spherical cap is arranged in particular such that the minimum distance of the spherical cap from the cylinder bore on the inlet side, looking in the direction of the cylinder longitudinal axis, is in particular 0 mm to 10 mm, in particular 2 mm to 6 mm.

In particular, the cylinder has a center plane, containing the longitudinal center axis of the cylinder and dividing the outlet opening down the middle. In particular, the cylinder has a transverse plane, containing the longitudinal center axis of the cylinder and standing perpendicular to the center plane. The geometric center of the spherical cap is in particular situated on the side of the transverse plane which is distant from the outlet opening.

The ratio of the largest dimension to the smallest dimension of the spherical cap in a projection in the direction of the longitudinal center axis of the cylinder is in particular at most 1.1. In particular, it is provided that the largest dimension of the spherical cap is situated parallel to the transverse plane and the smallest dimension of the spherical cap is situated parallel to the center plane. In particular, the spherical cap has a circular or approximately circular shape in a projection in the direction of the longitudinal center axis of the cylinder.

In particular, the transfer channels are oriented in an end section bordering on the transfer windows such that the mixture from the transfer channels flows into the combustion chamber with a directional component pointing away from the outlet opening. In this way, a better purging of the exhaust gases of the previous engine cycle from the combustion chamber and a better conversion of the mixture in the combustion chamber is achieved. The mixture flowing into the combustion chamber is moved in particular in the direction in which the spherical cap is arranged.

In particular, the two-stroke engine includes an air channel for preliminary storage of air in at least one transfer channel. This can improve the exhaust values of the internal combustion engine. Because exhaust gases are purged from the combustion chamber by the air stored in the transfer channels, the proportion of exhaust gases in the combustion chamber from the previous engine cycle can be decreased. In this way, a faster burning can be achieved in the combustion chamber.

In particular, at least one circumferential segment, in which a discharge opening of a transfer channel is situated, overlaps at least partly, in particular entirely, with the circumferential segment of the cylinder in which the outlet opening runs, looking in the direction of the longitudinal center axis of the cylinder. The circumferential segments in which the discharge opening and the outlet opening lie are thus circumferential segments of the cylinder about the longitudinal center axis. The discharge opening extends in particular along a first circumferential segment of the cylinder and the outlet opening extends in particular along a second circumferential segment. The first circumferential segment and the second circumferential segment overlap in particular at least partly. It can be provided that the second circumferential segment lies entirely inside the first circumferential segment. Alternatively, it can be provided that the first circumferential segment lies entirely within the second circumferential segment. In particular, the outlet opening and the discharge opening are arranged symmetrically to the center plane of the cylinder.

In particular, at least one transfer channel runs in a spiral around the cylinder bore. Accordingly, the transfer channel does not run parallel to the longitudinal center axis of the cylinder, but instead at an inclination to the longitudinal center axis of the cylinder, looking in a side view of the cylinder. Especially in particular, at least two transfer channels, in particular all transfer channels of the two-stroke engine, emerge at one common discharge opening into the crankcase interior.

BRIEF DESCRIPTION OF DRAWINGS

The invention will now be described with reference to the drawings wherein.

DETAILED DESCRIPTION

Figure 1:
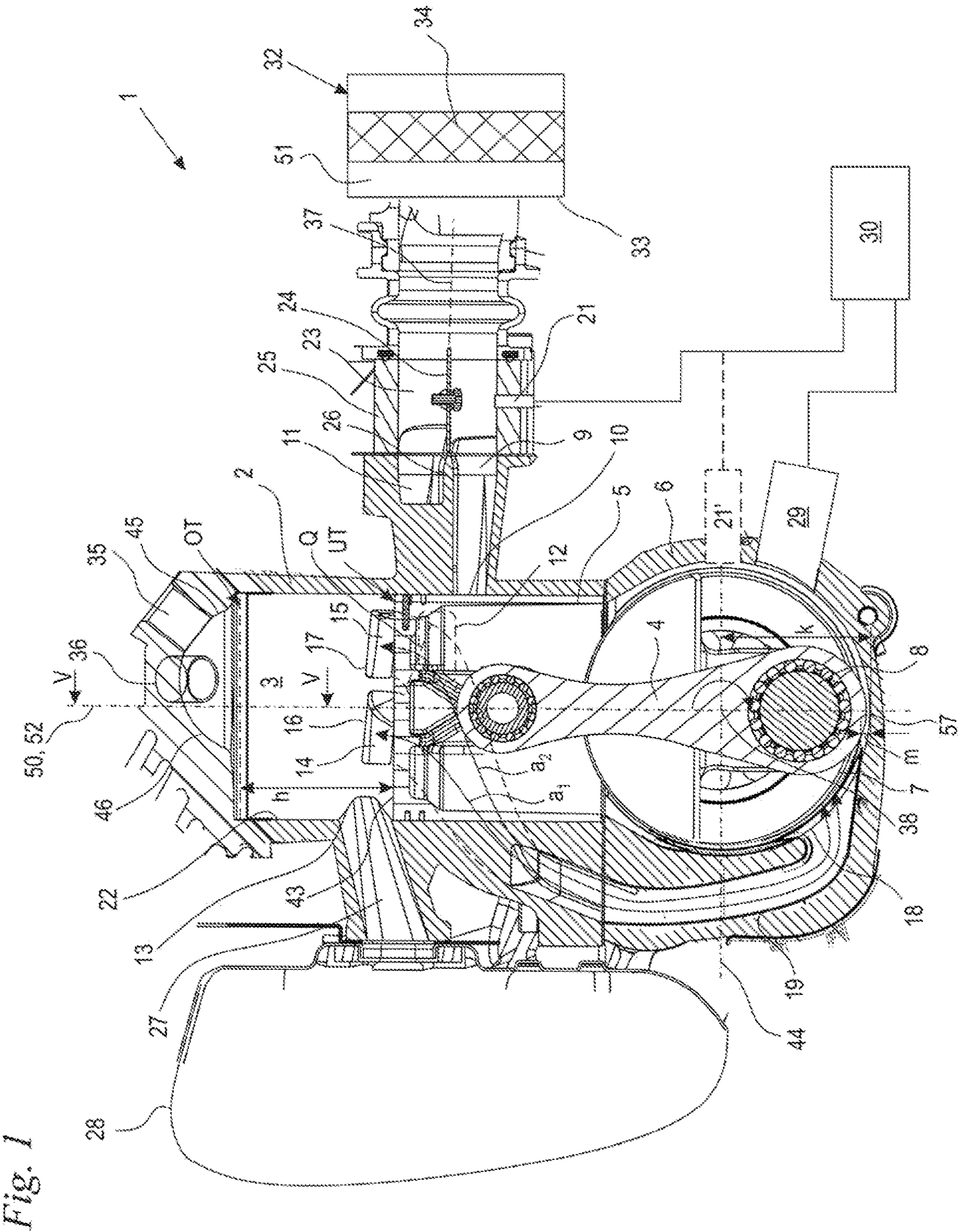
FIG. 1 shows a schematic sectional representation of a two-stroke engine.

FIG. 1 shows schematically a two-stroke engine 1. The two-stroke engine 1 is a single-cylinder motor. The two-stroke engine 1 can be used for example in a handheld work apparatus such as a cut-off grinder, a brushcutter, a chain saw, a blower, a lawn mower or the like. The two-stroke engine 1 includes a cylinder 2, in which a combustion chamber 3 is formed. The combustion chamber 3 is bounded by a piston 5. The piston 5 is movably mounted in a cylinder bore 22 of the cylinder 2. The piston 5 drives a crankshaft 8 rotatably mounted in a crankcase interior 7 of a crankcase 6 across a connecting rod 4. The crankshaft 8 is mounted so that it can turn about a rotational axis 38.

In the cylinder bore 22 there is arranged an outlet opening 13 from the combustion chamber 3, controlled by the piston 5, this opening being connected to an outlet channel 27. The outlet channel 27 emerges into an exhaust muffler 28.

The two-stroke engine 1 includes an air filter 32. In the air filter 32 there is arranged filter material 34, which separates a clean space 51 of the air filter 32 from the surroundings. The air filter 32 has an air filter base 33, which is connected to an intake channel 23. One section of the intake channel 23 is configured as a fuel supply unit 25 in the embodiment. The fuel supply unit 25 can be a carburetor, for example. Alternatively, the fuel supply unit 25 may include a fuel valve 21 for the proportioning of fuel. The fuel valve 21 can be an electromagnetic valve. It can be provided that the fuel valve 21 merely dispenses the quantity of fuel being supplied and the fuel is sucked up into the intake channel 23 by virtue of the negative pressure prevailing in the intake channel. Alternatively, the fuel valve 21 can be an injection valve. The fuel supply unit 25 encompasses a throttle element 24, such as a throttle flap. With the throttle element 24, the free flow cross section in the intake channel 23 can be adjusted by an operator.

It can also be provided that, instead of the fuel supply unit 25, only a throttle housing is provided for the mounting of the throttle element 24 and that the fuel is taken directly to the crankcase interior 7 by a schematically indicated fuel valve 21'.

In the embodiment, the intake channel 23 includes a partition wall, which divides the intake channel 23 into a mixture channel 9 and an air channel 11. Downstream from the throttle element 24, the intake channel 23 is divided by a partition wall section 26 into an air channel 11 and a mixture channel 9. In addition, a partition wall section 37 can be provided upstream from the throttle element 24. The mixture channel 9 emerges at a mixture channel opening 10 on the cylinder bore 22. The air channel 11 emerges with two air channel openings 12 on the cylinder bore 22, also being shown in FIG. 2.

The supplied quantity of fuel, when the fuel is supplied via a fuel valve 21, 21', is controlled by a control device 30. The control device 30 actuates the fuel valve 21. In particular, the two-stroke engine 1 includes a pressure sensor 29, which measures the pressure prevailing in the crankcase interior 7. The pressure sensor 29 is also connected in particular to the control device 30.

The piston 5 can move in the cylinder bore 22 between a lower dead center UT and an upper dead center OT. Between the lower dead center UT and the upper dead center OT, the piston 5 executes a stroke h.

In the region of the lower dead center UT of the piston 5, which is shown in FIG. 1, the crankcase interior 7 is fluidically connected to the combustion chamber 3, namely, by transfer channels 14 and 15. The transfer channels 14 emerge by transfer windows 16 in the combustion chamber 3. The transfer channels 15 emerge by transfer windows 17 in the combustion chamber 3. The transfer windows 16 are situated closer to the outlet opening 13 than the transfer windows 17. In the embodiment, the transfer channels 14, 15 have a common transfer channel 19. The transfer channels 14 and 15 are accordingly merged together. In the embodiment, a transfer channel 14 and a transfer channel 15 are arranged on either side of the cylinder 2. The transfer channels 14 and 15 are at first merged together on each cylinder side and then all the transfer channels 14, 15 are taken to the common transfer channel 19. The common transfer channel 19 emerges by a discharge opening 18 in the crankcase interior 7.

The transfer channels 14 and 15 are comparatively long in configuration. The crankcase 6 includes a crankcase plane 44. The crankcase plane 44 runs perpendicular to a longitudinal center axis 50 of the cylinder 2 and contains the rotational axis 38 of the crankshaft 8. In the embodiment, the discharge opening 18 is situated entirely on the side of the crankcase plane 44 which is distant from the cylinder 2.

The crankcase interior 7 has a lowest region 57. The lowest region 57 of the crankcase interior 7 is the region of the crankcase interior 7 on the side of the crankcase plane 44 which is distant from the cylinder 2 that has a greatest distance k from the crankcase plane 44.

The longitudinal center axis 50 of the cylinder 2, in an embodiment, runs through the lowest region 57. However, a different arrangement of the lowest region 57 can also be advantageous.

The discharge opening 18 has a distance m from the lowest region 57, measured in parallel with the longitudinal center axis 50 of the cylinder 2, which is in particular less than 20 mm, in particular less than 10 mm. In particular, the distance m is less than 7 mm, in particular less than 5 mm. The distance m can be 0 mm. A favorable configuration for the crankcase 6 is when the distance m from the discharge opening 18 to the lowest region 57 is not less than 0.5 mm, so that even with unfavorable tolerances there is a slight distance between the discharge opening 18 and the lowest region 57. In particular, the discharge opening 18 lies entirely on one side of a plane, where the plane contains the rotational axis 38 of the crankshaft 8 and the longitudinal center axis 50 of the cylinder 2. This plane may coincide with a transverse plane 52 to be described more closely in the following.

The distance m of the lowest region 57 from the discharge opening 18, as measured in parallel with the longitudinal axis 50 of the cylinder 2, is in particular less than 30%, in particular less than 20%, in particular less than 10% of the stroke h of the piston 5.

The distance m is measured in particular with respect to a region of the discharge opening 18 which is distant from the combustion chamber 3.

The transfer channels 14 have an average length $a_1$. The transfer channels 15 have an average length $a_2$. The average length $a_1$, $a_2$ of the transfer channels 14, 15 is measured from the discharge opening 18 to the transfer window 16, 17 in each cross section of the respective transfer channel 14, 15 situated perpendicular to the flow direction through the geometric center of the channel cross section. The average length $a_1$, $a_2$ divided by the piston displacement is in particular at least 2 mm/$cm^3$ for at least one, in particular for each transfer channel 14, 15. The piston displacement of the two-stroke engine 1 is the surface of the cylinder bore 22 multiplied by the stroke h of the piston 5.

In particular, the piston displacement of the two-stroke engine 1 is from 50 $cm^3$ to 100 $cm^3$.

The average length $a_1$, $a_2$ of at least one, in particular that of each transfer channel 14, 15 is in particular at least 50 mm, in particular at least 80 mm. The average length $a_1$, $a_2$ of at least one, in particular that of each transfer channel 14, 15 is in particular at least 90 mm, especially in particular at least 100 mm. In particular, at least the average length $a_2$ of the transfer channels 15 whose transfer windows 17 are situated close to the mixture inlet 10 is at least 110 mm, in particular at least 120 mm. In particular, the ratio of the average length $a_2$ of at least one of the transfer channels 15 whose transfer windows 17 are situated close to the mixture inlet 10 to the stroke h of the piston 5 is at least 2.5, in particular at least 3.

The ratio of the average length $a_1$, $a_2$ of at least one, in particular of each transfer channel 14, 15 to the stroke h of the piston 5 is at least 1.5, in particular at least 2, in particular at least 2.5, in particular at least 3.

FIG. 1 shows schematically a cross section Q, in which the cross section area of the transfer channel 15 is minimal. The smallest cross section area is the area of the transfer channel 15 in this cross section Q. The smallest cross section area of the transfer channel 14 or 15 can be for example from 50 $mm^2$ to 100 $mm^2$.

FIG. 1 also shows the spark plug opening 35 and the decompression valve opening 36, in which the spark plug and the decompression valve are to be arranged. As FIG. 1 also shows, the piston 5 has a piston base 43, which bounds the combustion chamber 3.

Figure 2:
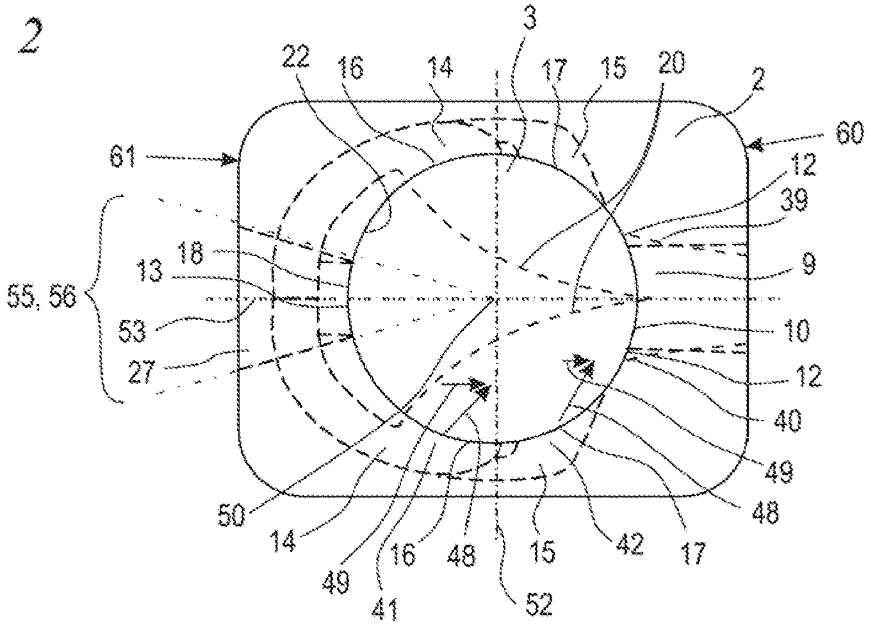
FIG. 2 shows a schematic representation of the cylinder of the two-stroke engine.

In FIG. 2, the cylinder 2 is shown schematically looking in the direction from the crankcase 6 to the cylinder bore 22. The piston 5 possesses two piston pockets 20. As FIG. 2 shows, the air channel 9 is divided into two branches 39, 40. The branches 39 and 40 each emerge by an air channel opening 12 in the region of one of the piston pockets 20 of the piston 5 on the cylinder bore 22. In the region of the upper dead center OT (FIG. 1) of the piston 5, the air channel 11 is connected via the piston pockets 20 to the transfer channels 14 and 15. In the region of the upper dead center OT of the piston 5, air can thus be stored in the transfer channels 14 and 15.

FIGS. 1 and 2 also show the longitudinal center axis 50 of the cylinder 2. As FIG. 2 shows, the cylinder 2 has a center plane 53. The center plane 53 divides the outlet opening 13 down the middle and contains the longitudinal center axis 50 of the cylinder. The cylinder 2 moreover has a transverse plane 52, which runs perpendicular to the center plane 53. The transverse plane 52 likewise contains the longitudinal center axis 50 of the cylinder.

As FIG. 2 shows, the discharge opening 18 is situated in a first circumferential segment 55 of the cylinder 2. The first circumferential segment 55 is a segment of the cylinder 2 about the longitudinal center axis 50. The outlet opening 13 is situated in a second circumferential segment 56. In the embodiment, the circumferential segments 55 and 56 coincide. In particular, the circumferential segments 55 and 56 intersect at least partly. It can be provided that the first circumferential segment 55, along which the discharge opening 18 extends, is larger than the second circumferential segment 56 of the outlet opening 13. However, it can also be provided that the second circumferential segment 56 of the outlet opening 13 is larger than the first circumferential segment 55 of the discharge opening 18.

The transfer channels 14 and 15 each have an end section 41, 42. The end sections 41, 42 are configured such that air and mixture from the transfer channels 14 and 15 flow in an inflow direction 48 into the combustion chamber 3. The inflow direction 48 can be different for each transfer channel 14, 15. However, the inflow directions 48 for each transfer channel 14, 15 have a directional component 49 pointing in the direction of the mixture channel opening 10, that is, away from the outlet opening 13. The directional component 49 is a directional component perpendicular to the transverse plane 52.

In operation of the two-stroke engine 1, during the upstroke of the piston 5 the mixture channel opening 10 is opened and fuel/air mixture is sucked into the crankcase interior 7. In the case of a fuel valve 21' on the crankcase 6, air is sucked in through the mixture channel opening 10 and the fuel is taken via the fuel valve 21' to the crankcase interior 7. In the region of the upper dead center OT of the piston 5, air from the air channel 11 is stored in the transfer channels 14 and 15 via the piston pockets 20 (FIG. 2). During the downstroke of the piston 5, the mixture in the crankcase interior 7 is compressed. When the piston 5 opens the transfer windows 16 and 17, at first the air stored in the transfer channels 14 and 15 flows out from them and then the mixture flows into the combustion chamber 3. The incoming air purges exhaust gases from the combustion chamber 3. During the upstroke of the piston 5, the fuel/air mixture in the combustion chamber 3 is compressed and ignited by a spark plug situated in the spark plug opening 35 in the region of the upper dead center of the piston 5. During the downstroke of the piston 5, at first the outlet opening 13 is opened, so that exhaust gases can escape from the combustion chamber 3. The transfer windows 16 and 17 are then opened and air and mixture for the next engine cycle flow into the combustion chamber 3.

It is proposed that the transfer channels 14 and 15 have a comparatively large average length $a_1$, $a_2$. The average length $a_1$, $a_2$ of each transfer channel 14, 15 relative to the piston displacement is at least 2 mm/$cm^3$. In order to achieve a rapid flow of fresh mixture into the combustion chamber 3 despite the large length of the transfer channels 14, 15, it is provided that the volume of the crankcase interior 7 including the volume of all the transfer channels 14, 15 is comparatively small. The volume of the crankcase interior 7 relative to the piston displacement is in particular at most 3.1.

The volume of the transfer channels 14 and 15 is in particular comparatively small, especially also in particular given a large length of the transfer channels 14 and 15. In particular, the ratio of the volume of all transfer channels 14, 15 to the piston displacement is at least 1. In particular, the volume of all transfer channels 14 and 15 is greater than the piston displacement. In particular, the ratio of the volume of all transfer channels 14 and 15 to the piston displacement is at least 1.3, in particular at least 1.5, in particular at least 1.6. The volume of all transfer channels 14 and 15 here is the total volume of all the transfer channels 14 and 15. The volume of all the transfer channels 14 and 15 is the sum of the volumes of all the transfer channels 14 and 15.

In order to achieve a good filling of the combustion chamber 3, an adjustment of the geometry of the combustion chamber 3 is proposed, making possible a rapid burning in the combustion chamber 3 and thus a relatively low residual pressure of the exhaust gases in the combustion chamber 3. In this way, it is possible to keep low the volume of exhaust gases flowing out from the combustion chamber 3 into the transfer channels 14 and 15. In order to accomplish a rapid burning, it is provided in particular that the geometrical compression ratio of the combustion chamber 3 is at least 10.0.

Figure 3:
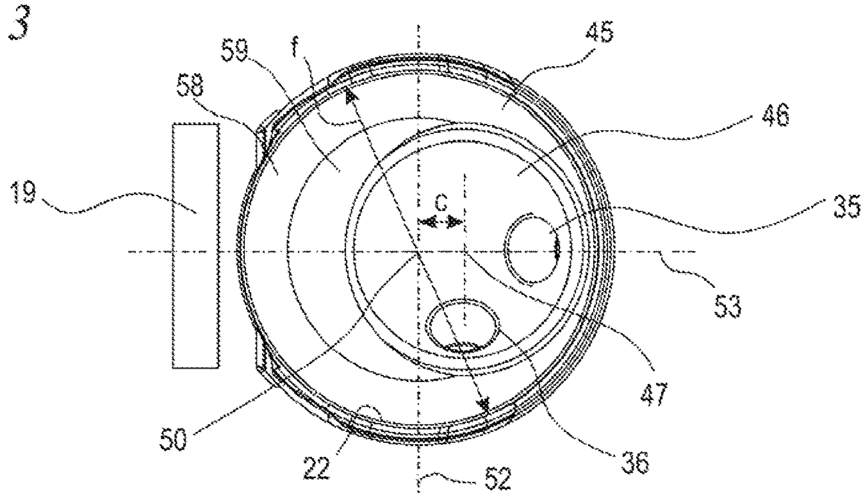
FIG. 3 is a cutout representation of the cylinder looking in the direction from the crankcase to the combustion chamber roof.
Figure 4:
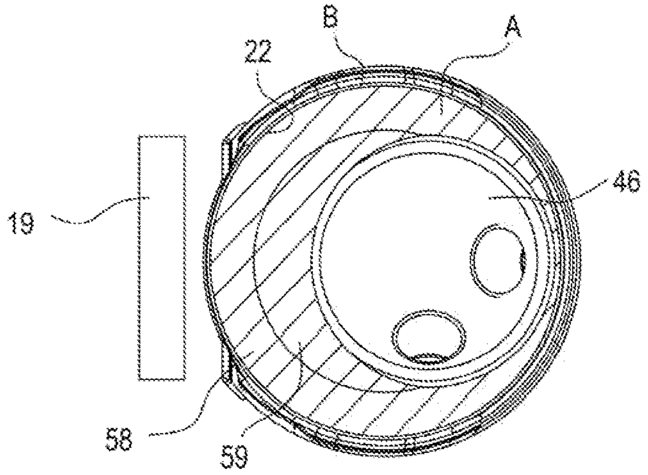
FIG. 4 shows the representation of FIG. 3, with the squish surface shown hatched.

FIGS. 3 and 4 show the configuration of a combustion chamber roof 45 of the combustion chamber 3. As shown by FIGS. 3 and 4, the combustion chamber roof 45 includes a spherical cap 46. The spherical cap 46 has a geometric center 47, situated with a spacing c from the longitudinal center axis 50 of the cylinder 2. The spacing c is in particular 3% of a diameter f of the cylinder bore 22. In particular, the spacing c is at least 2 mm, in particular at least 5 mm. The geometric center 47 of the spherical cap 46 is situated in particular on the side of the transverse plane 52 where the mixture channel opening 10 is also situated (see FIG. 1). The geometric center 47 of the spherical cap 46 and the outlet opening 13 are situated in particular on opposite sides of the transverse plane 52, as also shown by FIG. 1. The spark plug opening 35 in the embodiment is arranged symmetrically to the center plane 53. The decompression valve opening 36 in the embodiment is arranged on the side of the transverse plane 52 where the geometric center 47 of the spherical cap 46 is also situated.

The ratio of the average length $a_1$, $a_2$ of the transfer channel 14, 15 to the diameter f of the cylinder bore 22 is at least 1.5, in particular at least 2, in particular at least 3, in particular for at least one transfer channel 14 or 15, in particular for each transfer channel 14, 15.

As shown by FIG. 3, the combustion chamber roof 45 includes a flat region 58, reaching close to the cylinder bore 22. The piston base 43 moreover includes an inclined region 59, situated in the embodiment between the flat region 58 and the spherical cap 46.

The cylinder 2 has an inlet side 60 and an outlet side 61, which are indicated in FIG. 2. The inlet side 60 of the cylinder 2 is the side where the mixture channel opening 10 of the mixture channel 9 is located in the crankcase 6. The outlet side 61 of the cylinder 2 is the side of the cylinder 2 where the outlet opening 13 is located.

Figure 6:
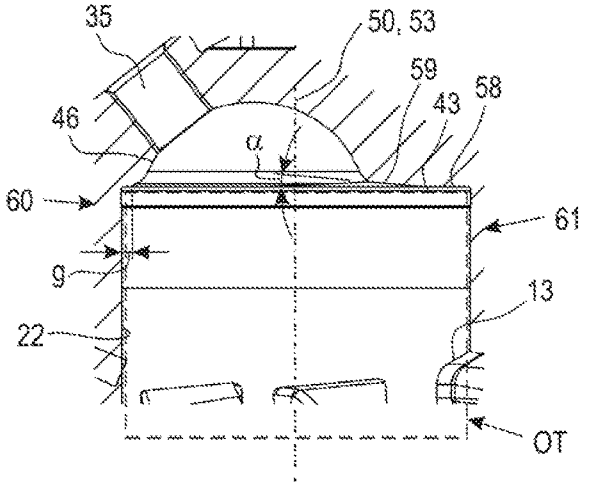
FIG. 6 shows a cross section along line VI-VI in FIG. 5.

As shown by FIG. 6, the spherical cap 46 is situated closer to the inlet side 60 than to the outlet side 61. The spherical cap 46 in particular is arranged such that the minimum distance g between the spherical cap 46 and the cylinder bore 22 on the inlet side 60, looking in the direction of the longitudinal center axis 50 of the cylinder 2, is from 0 mm to 10 mm, in particular from 2 mm to 6 mm. The distance i of the spherical cap 46 from the cylinder bore 22 on the outlet side 61 is in particular greater than the distance g on the inlet side 60. Both the distance i and the distance g are measured looking in the direction of the longitudinal center axis 50, in particular perpendicular to the longitudinal center axis 50.

Figure 5:
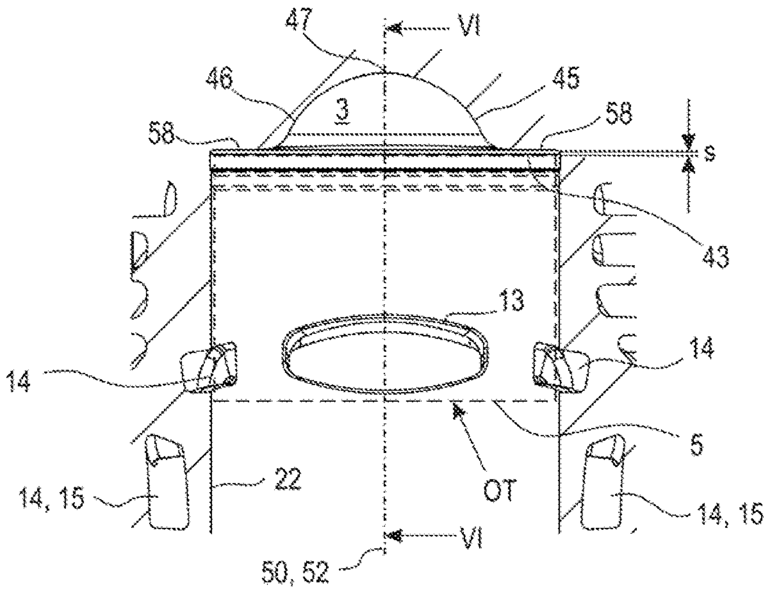
FIG. 5 is a sectional representation of the cylinder with schematically indicated piston along line V-V in FIG. 1.

As shown by FIGS. 5 and 6, the combustion chamber roof 45 extends in the flat region 58 perpendicular to the longitudinal center axis 50 of the cylinder 2. Between the flat region 58 and the piston base 43 there is formed a squish gap s at the upper dead center OT. The squish gap s in particular is less than 0.7 mm. In this way, the mixture is displaced very quickly from this region into the region of the spherical cap 46, so that great turbulence is produced in the combustion chamber 3. This accomplishes a rapid conversion of the mixture in the combustion chamber 3 and the residual pressure in the combustion chamber 3 which is present during the downstroke of the piston 5 at the time of the opening of the transfer windows 16, 17 can be decreased.

In the inclined region 59, the combustion chamber roof 45 is tilted relative to the piston base 43 by an angle α. In the embodiment, the piston base 43 runs perpendicular to the longitudinal center axis 50. The angle α can be as much as 5°.

The squish surface A of the combustion chamber roof 45 is indicated in FIG. 4. The squish surface A encompasses the regions 58 and 59, that is, all the regions in which the combustion chamber roof 45 runs at an incline of up to 5° to the piston base 43. The ratio of the squish surface A of the combustion chamber roof 45 to the surface B of the cylinder bore 22 is in particular at least 40%, in particular 40% to 50%. In this way, a faster burning is achieved.

Figure 7:
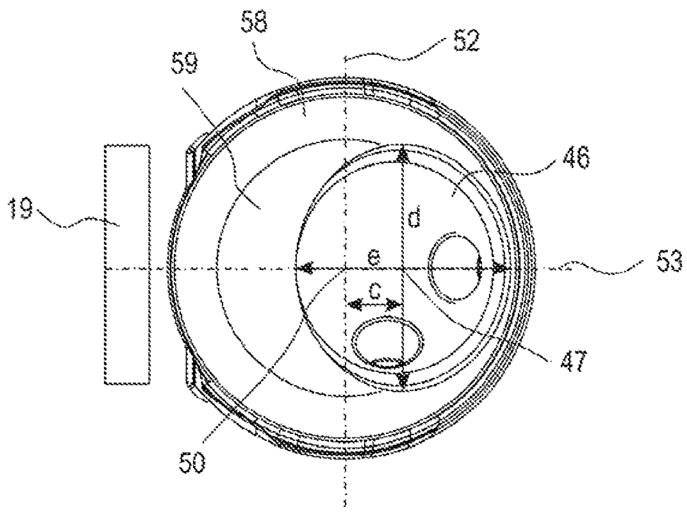
FIG. 7 is a representation of the combustion chamber roof of a cylinder of another embodiment of a two-stroke engine looking in the direction from the crankcase to the combustion chamber roof.

In the embodiment, the spherical cap 46 is round in configuration in a projection in the direction of the longitudinal center axis 50, as shown in particular by FIGS. 4 and 5. FIG. 7 shows a further embodiment in which the spherical cap 46 is formed with a nonround cross section. The spherical cap 46 in FIG. 7 has a somewhat elliptical shape. The geometric center 47 of the spherical cap 46 has a distance c from the longitudinal center axis 50. The spherical cap 46 has a largest dimension d, which is oriented in the embodiment parallel to the transverse plane 52. The spherical cap 46 moreover has a smallest dimension e, as measured in the embodiment perpendicular to the largest dimension d. The smallest dimension e in the embodiment is oriented in the direction of the center plane 53. The largest dimension d relative to the smallest dimension e is in particular at most 1.1. In FIGS. 3,4 and 7, the common channel 19 of the transfer channels 14, 15 is also shown.

It is understood that the foregoing description is that of the preferred embodiments of the invention and that various changes and modifications may be made thereto without departing from the spirit and scope of the invention as defined in the appended claims.

The invention claimed is:

1. A two-stroke engine comprising:

a cylinder having a cylinder bore;

a combustion chamber formed in said cylinder bore;

a crankcase defining a crankcase interior;
a crankshaft rotatably mounted in said crankcase;
a reciprocating piston configured to drive said crankshaft;
said combustion chamber being bounded by said reciprocating piston;
at least one transfer channel;
said crankcase interior being fluidically connected to said combustion chamber across said at least one transfer channel in at least one position of said reciprocating piston;
said at least one transfer channel emerging with a discharge opening in said crankcase interior and emerging with at least one transfer window on said cylinder bore;
an intake channel;
a fuel supply unit for supplying of fuel to said intake channel or said crankcase interior;
an outlet opening from said combustion chamber;
wherein all of said at least one transfer channels have an average length as measured from said discharge opening to said transfer window;
wherein said average length of said at least one transfer channel is at least 1.5 in relation to a stroke of said piston; and,
said crankcase interior defining a crankcase volume including all of said at least one transfer channels being at most 3.1 in relation to a piston displacement.

2. The two-stroke engine of claim 1, wherein a ratio of said average length of said at least one transfer channel to the stroke of said piston is at least 2.

3. The two-stroke engine of claim 1, wherein a ratio of said average length of each of said at least one transfer channels to the stroke of said piston is at least 2.

4. The two-stroke engine of claim 1, wherein said average length of each of said at least one transfer channels in relation to said piston displacement of the two-stroke engine is at least 2 $mm/cm^3$.

5. The two-stroke engine of claim 1, wherein said average length of said at least one transfer channel is at least 50 mm.

6. The two-stroke engine of claim 1, wherein said average length of said at least one transfer channel is at least 80 mm.

7. The two-stroke engine of claim 1, wherein said average length of each of said at least one transfer channels is at least 50 mm.

8. The two-stroke engine of claim 1, wherein said discharge opening of said at least one transfer channel runs at least partly on a side of a crankcase plane which is distant from said cylinder; and, said crankcase plane runs perpendicular to a longitudinal center axis of said cylinder and contains a rotational axis of said crankshaft.

9. The two-stroke engine of claim 8, wherein said discharge opening of said at least one transfer channel runs entirely on said side of said crankcase plane.

10. The two-stroke engine of claim 1, wherein a geometrical compression ratio of the combustion chamber is at least 10.0.

11. The two-stroke engine of claim 1, wherein said combustion chamber has a combustion chamber roof; said cylinder bore defines a cylinder bore surface; and, a ratio of a squish surface of said combustion chamber roof to said cylinder bore surface is at least 40%.

12. The two-stroke engine of claim 1, wherein said combustion chamber has a combustion chamber roof; said cylinder bore defines a cylinder bore surface; and, a ratio of a squish surface of said combustion chamber roof to said cylinder bore surface is 40% to 50%.

13. The two-stroke engine of claim 1, wherein a squish gap in an upper dead center of said piston is less than 0.7 mm.

14. The two-stroke engine of claim 1, wherein said combustion chamber has a combustion chamber roof; and, said combustion chamber roof includes a spherical cap having a geometric center at a distance from a longitudinal center axis of said cylinder.

15. The two-stroke engine of claim 14, wherein said cylinder has a center plane containing said longitudinal center axis of said cylinder and centrally dividing said outlet opening; said cylinder has a transverse plane containing said longitudinal center axis of said cylinder and standing perpendicular to said center plane; and, said geometric center of said spherical cap is situated on a side of said transverse plane which is distant from said outlet opening.

16. The two-stroke engine of claim 1, wherein said combustion chamber has a combustion chamber roof; said combustion chamber roof includes a spherical cap; said cylinder defines a longitudinal center axis; and, a ratio of a largest dimension to a smallest dimension of said spherical cap in a projection in a direction of said longitudinal center axis of said cylinder is at most 1.1.

17. The two-stroke engine of claim 1, wherein said at least one transfer channel is oriented in an end section bordering on said transfer windows such that a mixture from said at least one transfer channel flows into said combustion chamber with a directional component pointing away from said outlet opening.

18. The two-stroke engine of claim 1 further comprising an air channel for preliminary storage of air in said at least one transfer channel.

19. The two-stroke engine of claim 1, wherein said discharge opening of said at least one transfer channel extends along a first circumferential segment of said cylinder and said outlet opening extends along a second circumferential segment of said cylinder; and, said first circumferential segment and said second circumferential segment at least partially overlap.

20. The two-stroke engine of claim 1, wherein at least one of said at least one transfer channels runs in a spiral around said cylinder bore.

21. The two-stroke engine of claim 1, wherein the two-stroke engine includes at least two of said transfer channels emerging at said discharge opening into the crankcase interior.

22. The two-stroke engine of claim 1, wherein all of said at least one transfer channel emerge at said discharge opening into the crankcase interior.

* * * * *